No. 782,283.

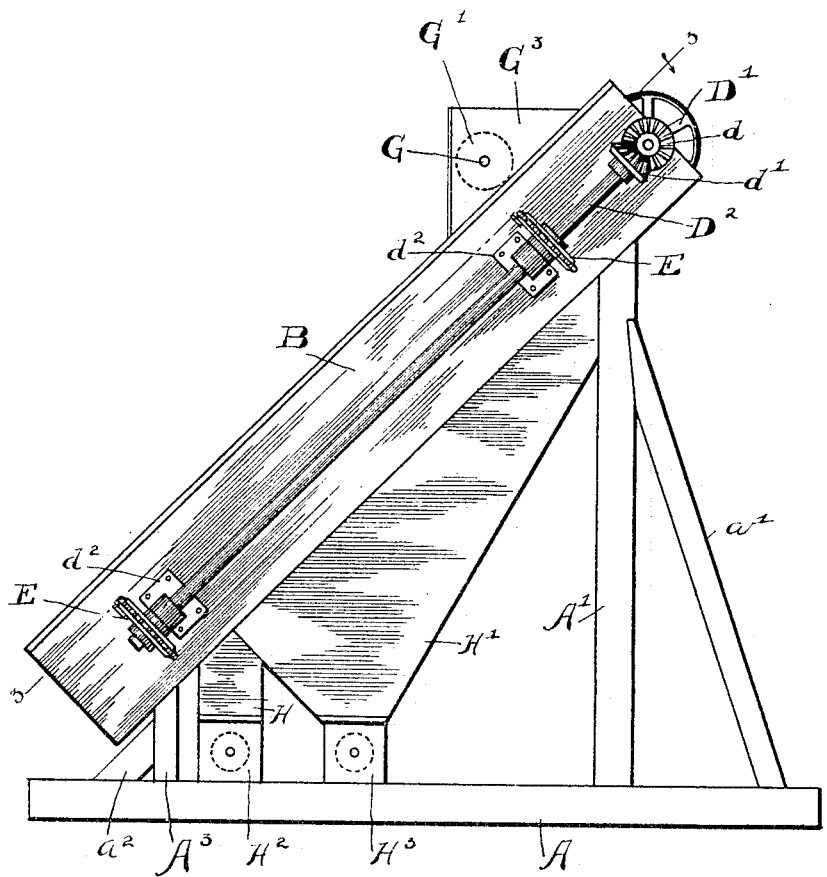

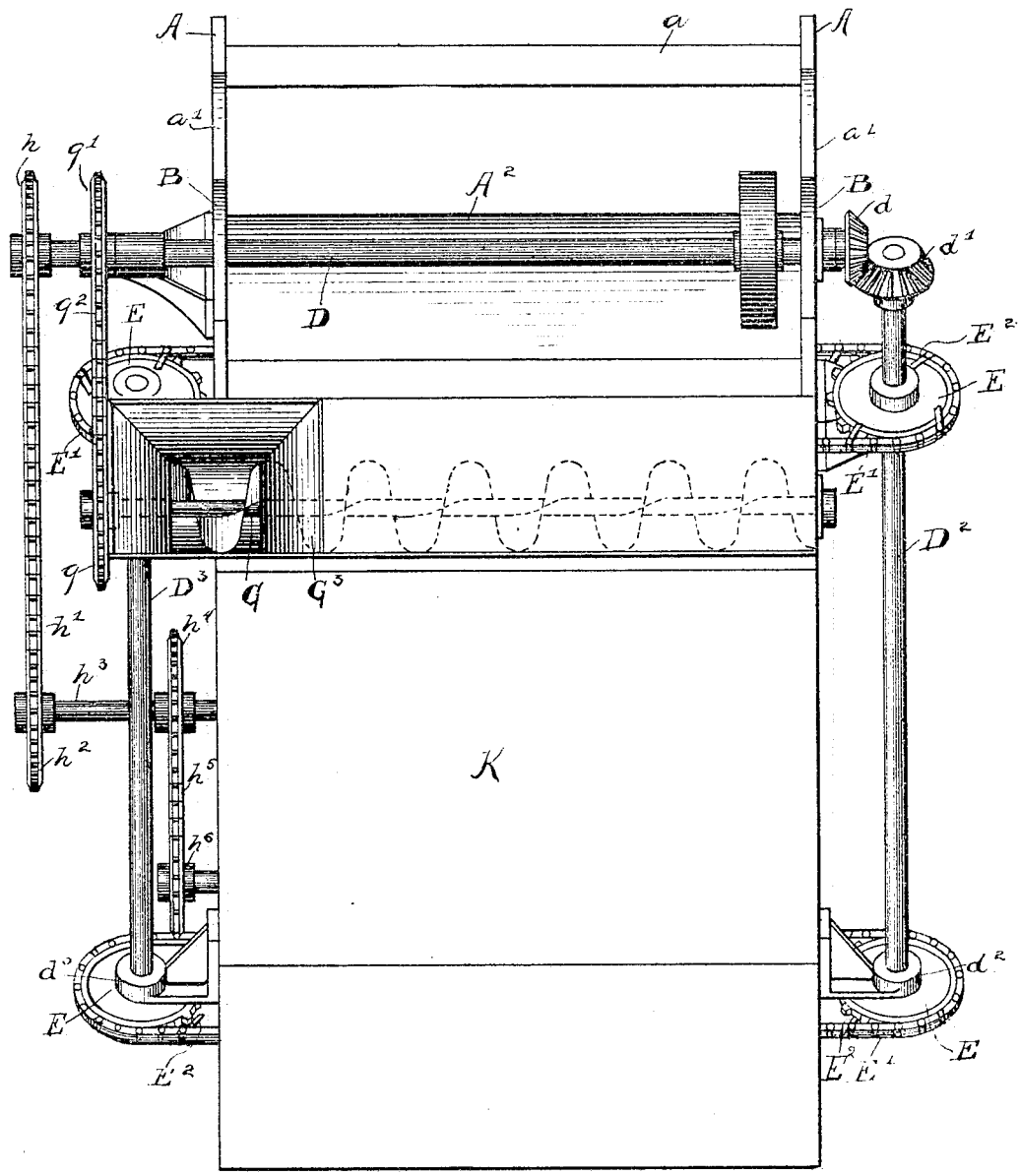

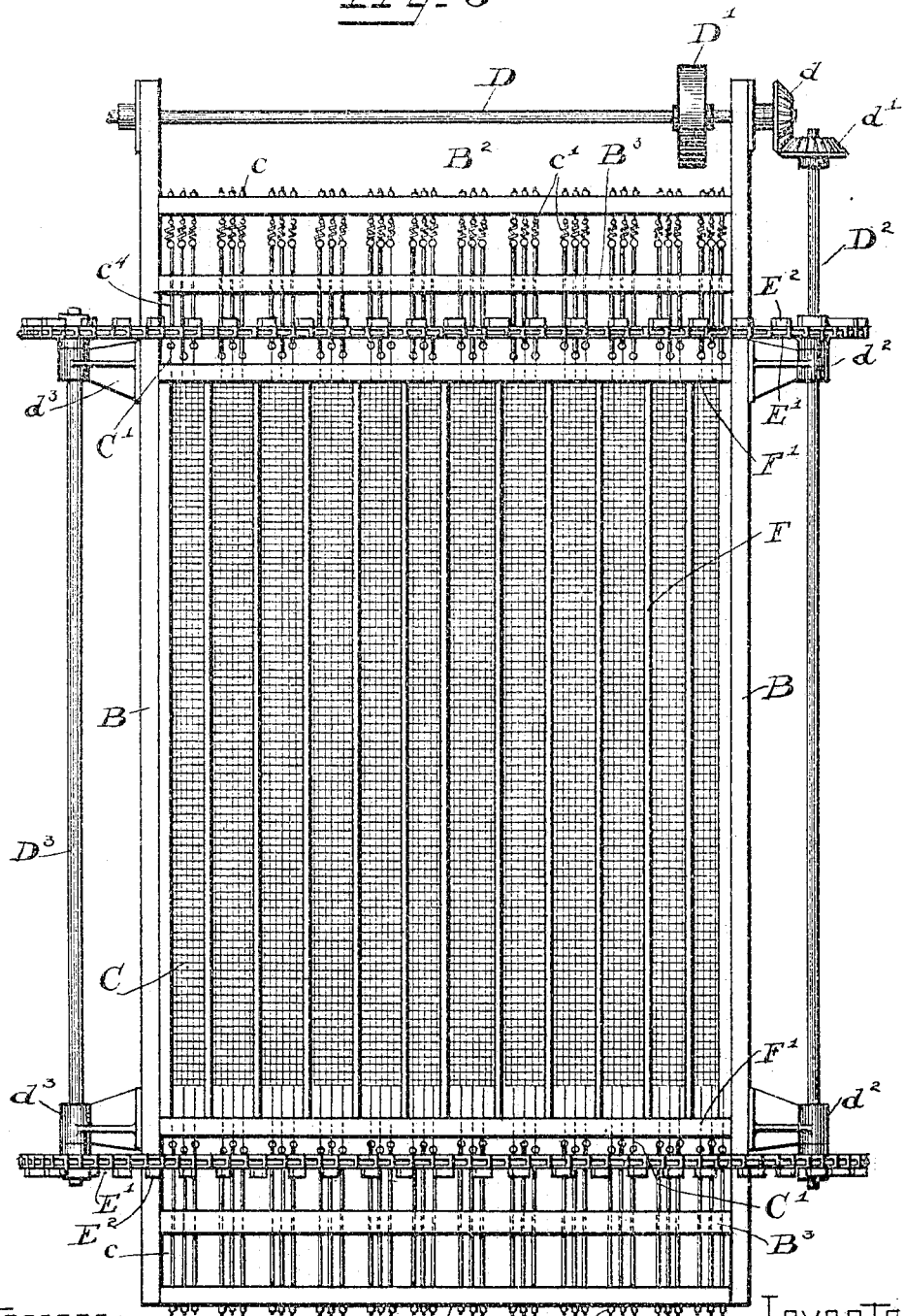

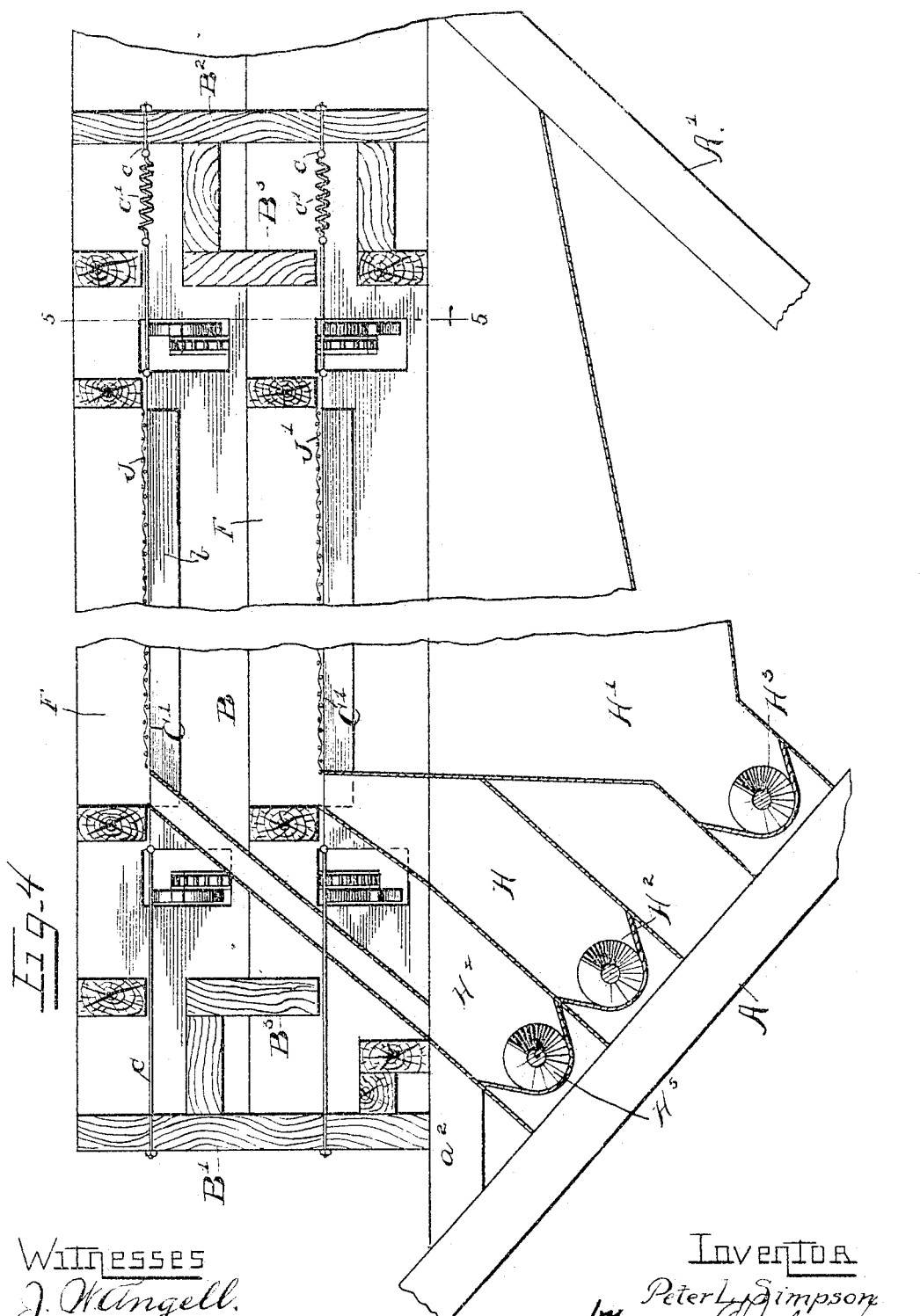

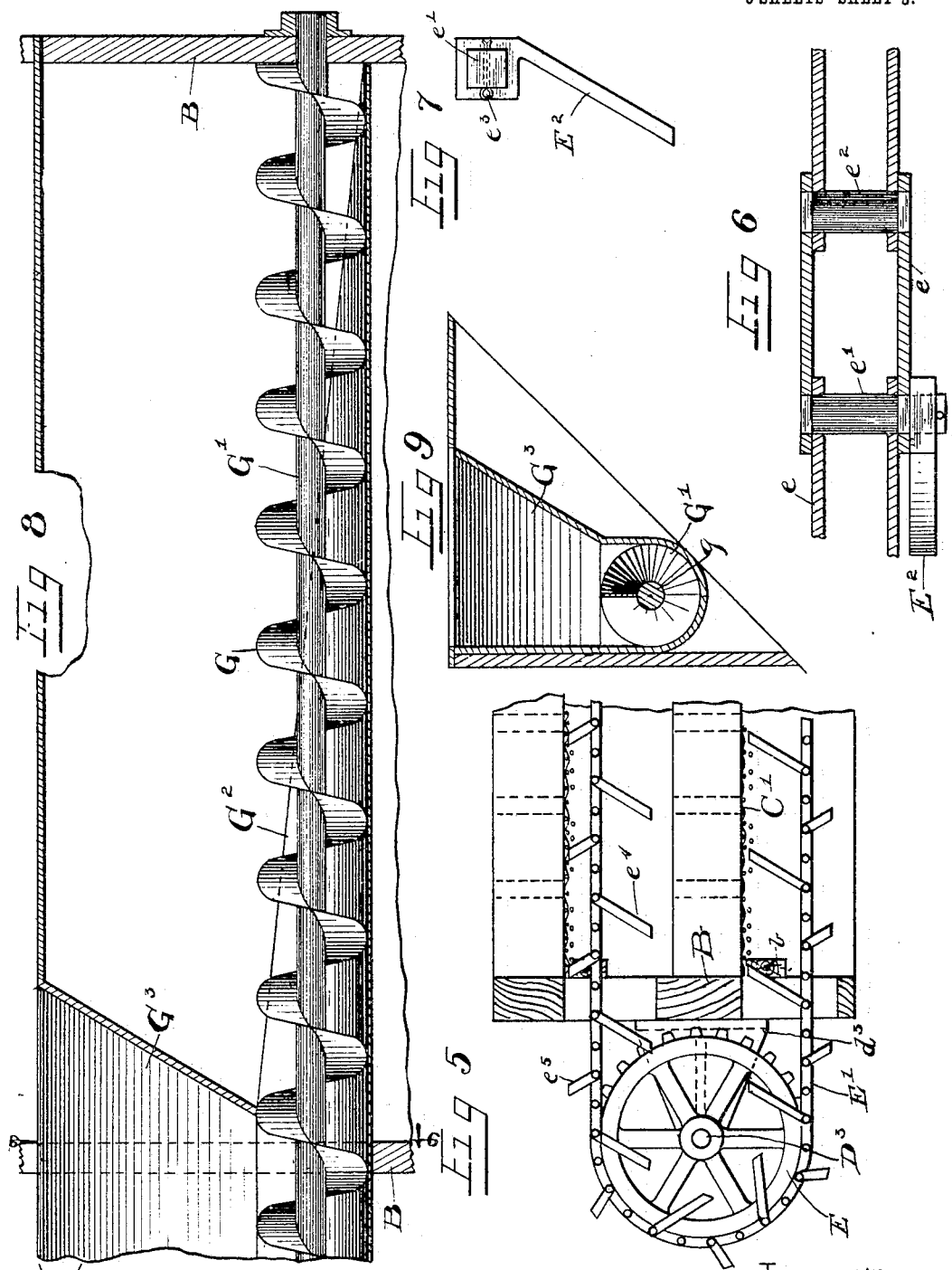

Patented February 14, 1905.

UNITED STATES PATENT OFFICE.

PETER L. SIMPSON, OF WILLOUGHBY, OHIO, ASSIGNOR TO HERBERT S. SIMPSON.

SEPARATOR-SCREEN.

SPECIFICATION forming part of Letters Patent No. 782,283, dated February 14, 1905.

Application filed April 18, 1904. Serial No. 203,677.

*To all whom it may concern:*

Be it known that I, PETER L. SIMPSON, a citizen of the United States, and a resident of Willoughby, Lake county, Ohio, (whose post-office address is Box 157, Willoughby, Ohio,) have invented certain new and useful Improvements in Separator-Screens, of which the following is a full, clear, and exact description, reference being had to the accompanying drawings, and to the letters of reference marked thereon, which form a part of this specification.

This invention relates to separator-screens adapted for separating or screening coal, ore, gravel, and other material which it is desired to screen and grade. Heretofore in devices of this kind it has usually been customary to use either a reciprocating screen or an endless screen, both of which devices have been more or less unsatisfactory, owing to the fact that in the former there is a tendency for the finer material to slide with the coarser material over the surface of the screen without thoroughly grading, thereby permitting a considerable portion of the smaller particles to be carried from the screen with the larger particles. In an endless screen it has usually been customary to have the screen engage during its travel with certain stationary parts or projections in order to secure a sufficient vibration, and said parts have occasioned more or less tearing and breaking of the screen.

The object of this invention is to provide a separating or grading screen provided with means whereby the screen is given a continuous vibratory motion from successive impacts or blows from beneath the screen at a right angle with the plane thereof and at intervals in its width.

It is a further object of my invention to provide a strong and durable construction, though cheap and simple and constructed to reduce the wear on the screen to a minimum.

The invention consists in the matters hereinafter described, and more fully pointed out and defined in the appended claims.

In the drawings, Figure 1 is a side elevation of a device embodying my invention. Fig. 2 is a top plan view of the same. Fig. 3 is a front elevation of the screen and means for vibrating the same with the conveyer and the cover omitted. Fig. 4 is a fragmentary longitudinal section showing the screen made double. Fig. 5 is a transverse section taken on line 5 5 of Fig. 4. Fig. 6 is an enlarged longitudinal section of the chain, showing the tappet-blades thereon. Fig. 7 is a side elevation of one of the tappet-blades. Fig. 8 is an enlarged side elevation of the distributing-conveyer. Fig. 9 is a transverse section taken on line 9 9 of Fig. 8.

As shown in said drawings, a rigid supporting-frame is provided comprising longitudinal sills A, connected by the transverse beams $a$, of which the rear one only is shown. Uprights or posts A' are secured on said sills near their rear ends. Braces $a'$ engage said sills and posts, and the posts are engaged together at their upper ends by the cross-beam A². At the forward end of said sills comparatively short uprights or posts A³ are provided and are rigidly braced on said sills by the braces $a^2$. Supported on said frame in an inclined position is the separating-screen of wire-netting, the frame of which comprises the side walls B B, the lower end wall B', and the upper end wall B², all of which may be of any desired length, width, or material. Extending transversely of said frame, near each end thereof, is a cross-beam B³, which acts to stiffen said frame transversely. A wire screen C is stretched tightly across the central portion of said screen-frame and is rigidly secured to the side walls B B by means of the longitudinal retaining-strips $b$, which after the screen is secured thereto are rigidly engaged to said side frame members B in any desired manner, thus stretching the screen and firmly binding the edges of said screen thereto. The upper end of the wire-netting is secured beneath a transverse frame member F', and a similar transverse member is provided a short distance below the lower edge of the screen, but affording space to permit material to fall therethrough. Means are provided for imparting a vibratory motion to said screen comprising a plurality of fine strong cords C′, such as piano-wires, which extend longitudinally of the screen-frame in close proximity with the under side of the wire-net and are secured to the transverse members F′ of the screen-frame. Said cords may be secured to the screen in any desired manner to enable the requisite tension to be secured. As shown, however, threaded eye-bolts $c$ extend through said transverse members B′ B² and are provided on their outer ends with nuts to afford adjustment. Coiled springs $c′$ engage in the eyebolts at the upper end of the frame and at their inner ends engage strong rods $c^4$, of metal, preferably steel, which are provided with an eye at each end, in one of which the inner end of the spring engages and in the other of which the upper end of the piano-wire or other cord C′ is secured. The lower end of said wire or cord is also connected in the eye or loop of lower eyebolt. Each cord is thus afforded a resilient connection at one end of the frame, or at both, as preferred, and is capable of adjustment to any desired tension. Said cords, as shown, are arranged in groups of three at intervals in the width of the screen, and dividing-rods (of any suitable material) F are connected at their ends with the transverse members F′ and lie between adjacent groups of cords, as shown in Fig. 3. If preferred, the screen if narrow may be secured at its edges to said rods, which in any event afford fixed members between which the screen is vibrated by the intermediate cords. Said cords are mechanically vibrated. For this purpose the upper ends of the side members B B extend beyond the end frame member B², and a transverse shaft D, provided with a suitable driving-pulley D′, is journaled thereon and adapted to be driven from any source of power. On one end of said shaft D is a beveled gear $d$, adapted to mesh with a complemental beveled gear $d′$ on a shaft D², which is journaled longitudinally in suitable bearings $d^2$ $d^2$ on the frame member B of the screen-frame. On the opposite side frame member B are the brackets $d^3$ $d^3$, in which is journaled a shaft D³, parallel with the shaft D². Rigidly secured at each end of the wire net or screen are sprocket-chains, as shown in Fig. 6, which comprise a plurality of link-sections $e$, secured together by pintles $e′$ $e^2$, of which the pintles $e′$, which alternate with the pintles $e^2$, are rigidly engaged in one of said sections and extend beyond one side thereof, and each carries on its projecting end a tappet-blade E², which inclines oppositely from the direction of travel of said chain and is adapted to engage successively both the rods $c^4$ and eyebolts $c$, connected with the cords or wires C′, near the ends of the screen. The protruding ends of said pintles $e′$ are angular to prevent rotation of the tappet-blade thereon and are apertured to receive a cotter-pin $e^3$, which rigidly holds said blade in place. Journaled on the side walls B B, at the upper end of said screen, is a worm-conveyer G. On one end of the conveyer-shaft G′ is a sprocket-wheel $g$, in alinement with a similar sprocket-wheel $g′$ on the end of the shaft D, and over said wheels a sprocket-chain $g^2$ is trained, which acts to drive said conveyer when the shaft D is rotated. Rigidly secured on the side walls beneath said conveyer and in close proximity thereto is a conveyer-trough G², the top of which on the delivery side slants downwardly from the receiving end to the opposite extremity, thus distributing the material the entire width of the screen. Above said conveyer, at its receiving end, is a receiving-hopper G³, adapted to deliver material to said conveyer. Said hopper opens into said trough from outside the side frame member B.

Beneath the screen are the pockets or hoppers H and H′. The former is at the lower end of the screen and receives the coarse material, which does not pass through, but falls from the end of the screen. The latter extends the full length of said screen and catches all the graded material which passes through. Beneath the hoppers H and H′, respectively, are the conveyers H² and H³, similar to the worm-conveyer G or of any other desired type. Said conveyers carry the material to a point of delivery and, as shown in Fig. 2, are driven by a sprocket-wheel $h$, carried on the shaft D, from which a sprocket-chain $h′$ extends around a sprocket-wheel $h^2$, secured on the shaft $h^3$ of the lower conveyers $h^3$. A sprocket-wheel $h^4$ is also carried on the shaft $h^3$, and a sprocket-chain $h^5$ is trained over the same and over a sprocket-wheel $h^6$ on the shaft $h^7$ of the conveyer H² and acts to drive said conveyer. A hinged cover K to confine the dust and prevent the material from being thrown is secured over the top of the frame.

If preferred, more than one screen may be employed, as shown in Figs. 4 and 5, in which case the screen-frame is constructed of greater depth and the screens J and J′ are placed one above the other. When using a double screen, the sprocket-chain E′ is provided on each side thereof with tappet-blades $e^4$ and $e^5$, respectively, as shown more clearly in Fig. 5, of which the blades $e^4$ are adapted to coact with the wires of the upper screen and the tappet-blades $e^5$ to contact with the lower screens, and an extra hopper H⁴ and conveyer H⁵ are provided, as shown in Fig. 5.

The operation is as follows: The material is fed into the conveyer G, through the hopper G³, from any desired source and is conveyed transversely of the screen in the trough G². Owing to one side of said trough being cut away and slanted downwardly, the material is distributed evenly over the entire upper end of said screen and slides down and through the same. The tappet-blades E² on the sprocket-chains E' successively strike rods c⁴ or the wires C, first at one end and then at the other of the screen, causing the wires to vibrate against the under side of said screen and impart thereto a succession of light upward impacts. The material is thereby thrown upward successively by the vibration of the screen, causing the finer particles to pass through the meshes of said screen into the hopper H' and the coarser to fall over the lower end thereof into the hopper H. Any desired tension may be given to the wire C' by means of the eyebolts c, while the coiled springs c' impart greater resiliency to prevent said wires from breaking.

Obviously any type of frame or frames may be used and the same may be constructed of any desired materials and one or more than one screen may be employed, as preferred, and many details of construction and arrangement may be varied without departing from the principles of this invention.

I claim as my invention—

1. In a device of the class described, the combination with a rigid frame, of a plurality of flexible members adjustably engaged therein, a screen in close proximity with said flexible members, a plurality of tappet-blades adapted to strike said flexible members and means for carrying said blades transversely of the screen.

2. In a device of the class described the combination with a rigid frame, of a screen engaged therein, a plurality of wires in close contact with said screen, a flexible belt carried transversely of the frame and outwardly-directed means thereon adapted to strike said wires successively.

3. In a device of the class described, the combination with a rigid frame, of a screen engaged therein, a plurality of wires adjustably engaged in said frame in close proximity to and below said screen, means for delivering material uniformly on the screen, an endless chain, means for driving said chain transversely of the screen and blades thereon adapted to strike said wires successively.

4. The combination with an inclined screen of cords stretched beneath the same in groups and a flexible belt adapted for continuous travel transversely of the screen, at each end thereof and tapped blades thereon acting successively on each group of wires acting to vibrate the screen.

5. In a device of the class described, the combination with a frame, of a plurality of adjusting-rods at one end thereof, a plurality of rods at the opposite end thereof, coiled springs engaging said last-named rods to the end of the frame, a plurality of wires connecting said rods adapted to be adjusted thereby, a screen tautly stretched above said wire, endless chains adapted to travel across the same and means thereon adapted to strike said wires successively.

6. In a device of the class described the combination with a rigid frame, of a plurality of wires extending longitudinally thereof, means for adjusting said wires to the desired tension, a screen secured in said frame above said wires and in close relation therewith, a shaft journaled longitudinally on each side of said frame, sprocket-wheels thereon, sprocket-chains on said wheels and means on said chain adapted to vibrate said wires.

7. In a device of the class described the combination with a rigid frame of a plurality of groups of wires extending longitudinally thereof, means for adjusting said wires to the desired tension, a screen tightly stretched in said frame above the central portion of said wires and in close relation therewith, a shaft journaled on each side of said frame, an endless chain driven by said shaft at each end of the screen and means thereon acting to vibrate said wires.

8. In a device of the class described the combination with a rigid frame of a plurality of wires arranged in groups extending longitudinally thereof, a screen stretched tightly above said wires and in close relation therewith, a plurality of dividing-strips in close relation with the top of said screen and arranged alternately with said groups of wires, a shaft journaled on each side of said frame, sprocket-wheels thereon, sprocket-chains carried on said wheels and a plurality of blades thereon adapted to successively vibrate said wires.

9. In a separator, a rigid frame, a plurality of wires adjustably engaged longitudinally thereon, a screen supported on said frame and in close relation with said wires, a shaft journaled at each side of said frame, sprocket-wheels thereon, sprocket-chains on said wheels, a plurality of tappet-blades thereon adapted to contact with said wires, means for distributing material upon the screen and means for delivering the material from said screen.

10. In a separator the combination with a frame, of an inclined screen thereon, a plurality of wires extending longitudinally of said frame in close relation with said screen, a shaft journaled on each side of said frame, endless chains driven thereby, means on said chains acting to strike said wires successively from one side of the screen to the other, spacing-strips arranged between said wires above the screen and means for receiving material from the screen.

11. In a device of the class described the combination with a frame, of one or more screens therein, a plurality of wires adjustably engaged beneath the screen, a shaft journaled on each side of said frame, means adapted to operate said shaft, sprocket-wheels carried on said shaft at each end of the screen, sprocket-chains carried on said wheels and a plurality of blades projecting therefrom adapted to contact on said wires.

In testimony whereof I have hereunto subscribed my name in the presence of two subscribing witnesses.

PETER L. SIMPSON.

Witnesses:
W. W. WITHENBURY,
HJALMAR S. RUDD.